May 2, 1967     J. F. SUTHERLAND     3,317,792
LOAD PROTECTION CIRCUIT
Filed March 20, 1964
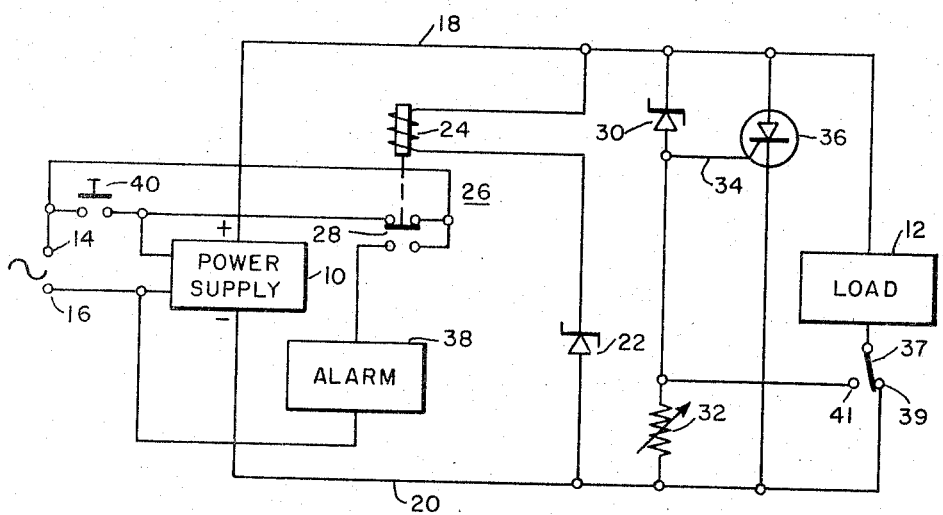
WITNESSES
Leon J. Jaza
James F. Young
INVENTOR
James F. Sutherland
BY (signature)
ATTORNEY United States Patent Office 3,317,792
Patented May 2, 1967

3,317,792
LOAD PROTECTION CIRCUIT
James F. Sutherland, Pittsburgh, Pa., assignor to Westinghouse Electric Corporation, Pittsburgh, Pa., a corporation of Pennsylvania
Filed Mar. 20, 1964, Ser. No. 353,508
5 Claims. (Cl. 317—31)

The present invention relates in general to a load protection circuit, and more particularly to a load protection circuit for sensing either one of an abnormal voltage condition or an abnormal current condition relative to a protected load.

It has been known in the prior art to employ a fuse device to protect a load relative to an abnormal voltage supply condition, but expensive load components such as transistor amplifiers and the like may not be adequately protected against an abnormal voltage condition by a fuse device because of similar breakdown type characteristics. An amplifier used in an analog system can be damaged by an abnormal voltage condition, and in addition erroneous operation can result from abnormal voltage conditions. The use of voltage sensitive relays by themselves to protect against undervoltage as well as overvoltage conditions may not be adequate to protect precision potentiometers and operational transistor amplifiers.

Accordingly, it is an object of this invention to provide an improved voltage condition sensing circuit that is better operative to detect both an above desired voltage condition as well a below desired voltage condition relative to a protected load.

It is another object to provide a faster acting and improved overvoltage protection circuit for precision potentiometers and transistor amplifiers needed in analog control systems.

In accordance with the present invention there is provided a voltage and/or current condition sensing and protection circuit operative with a power supply. A first branch circuit includes an undervoltage sensing device such as a relay connected across the power supply and energized through a voltage drop sensing first diode. The latter relay is caused to initiate an alarm or other suitable corrective action device such as a trip circuit whenever the energization of the relay through the first diode by the power supply falls under or below a predetermined value determined by the conduction voltage of the first diode. A second branch circuit includes an overvoltage sensing device such as a voltage breakdown second diode connected through a resistor across the power supply, and a connection therefrom to the control electrode of a controlled rectifier, with said second diode being subjected to the output voltage supplied by the power supply. The purpose of the resistor is to provide a relatively low impedance path for leakage current through the second Zener diode so that the controlled rectifier will not fire until the Zener breakdown voltage has ben exceeded. If said output voltage exceeds the breakdown voltage of the second diode, the latter second diode breaks down and a current is provided throngh the second diode to fire the rectifier which in effect then provides a very low impedance path across the power supply to thereby create an undervoltage condition relative to and sensed by the first diode and its associated alarm. If desired a load current sensing connection can be made to determine the switching of the controlled rectifier for the latter purpose.

Other objects and advantages of this invention will be readily apparent and better understood by reference to the following detailed description when considered in connection with the accompanying drawing which is a schematic circuit diagram of a protective circuit according to the present invention.

In the drawing there is shown a regulated power supply 10 operative to provide a constant 15 volts excitation at one or two amperes current limited energization to a load 12, which may comprise in the order of 100 or even 200 operational amplifiers, each costing in the open market about $100. The power supply 10 is energized through terminals 14 and 16 by a suitable 60 cycle and 110 volt source (not shown). Conductors 18 and 20 are connected from the power supply 10 to the load 12. An undervoltage condition sensing Zener diode 22, having a 13 volts breakdown characteristic, is connected between the conductors 18 and 20 through the control winding 24 of a double acting relay 26. The latter relay 26 includes a switch member or arm 28 having a first position as shown in the drawing when the control winding 24 is energized, and operative in the position shown in the drawing to connect the power supply 10 relative to the terminals 14 and 16. The switch arm 28 has a second position wherein the alarm 38 is energized from the terminals 14 and 16. A second protective branch circuit including a 17 volt breakdown Zener diode 30 is connected through a resistor 32 and between the conductors 18 and 20, and includes a connection 34 to the control electrode of a 25 volt and 4.7 ampere controlled rectifier 36. A circuit selecting switch 37 can be positioned to contact the terminal 39 when it is not desired to sense the load current and when a low impedance power supply 10 is provided. However, the switch 37 can be positioned to contact the terminal 41 to pass the load current through the resistor 32 if desired.

In the operation of the protective circuit shown in the drawing, the load 12 can be protected both for an abnormal voltage condition or an abnormal current condition relative to the power supply 10. With the particular regulated direct current power supply under consideration, should the limited current range of 1 or 2 amperes be exceeded, the output voltage collapses to a value below the 13 volts breakdown level of the Zener diode 22. Upon the conduction breakdown of the latter Zener diode 22, this interrupts the current flow through the control winding 24 such that the switch arm 28 drops in position to disconnect the power supply 10 relative to the terminals 14 and 16 and to energize an alarm 38 or trip device from the terminals 14 and 16.

After the power supply has been disconnected from the terminals 14 and 16, and the abnormal load corrected which caused the collapse of the voltage provided by the power supply 10 or the defective regulated power supply replaced, a manual reset button 40 is closed to again energize the power supply 10 such that the control winding 24 is now connected between the energized conductors 18 and 20 through the Zener diode 22. The latter diode 22 breaks down when the voltage between the conductors 18 and 20 exceeds the 13 volts breakdown level of the Zener diode 22. Energization of the control winding 24 in this manner causes the switch arm 28 to assume the position shown in the drawings such that the manual reset button 40 can now be released and the power supply 10 will continue to operate in its normal and intended manner to energize the load 12.

Should the output voltage from the power supply 10 exceed the 17 volts breakdown level of the Zener diode 30 a conductive path is provided thereby through the resistor 32 to provide a predetermined firing voltage which is applied to the control electrode of the rectifier 36. This causes the rectifier 36 to become conductive and thereby provide a one-half to one volt drop and low impedance conductive path between the conductors 18 and 20. When this happens the so provided relatively low voltage drop between the conductors 18 and 20 is not sufficient in value to maintain the conduction of the 13 volt breakdown Zener diode 22, such that the conductive path through the latter Zener diode 22 no longer is maintained and the control winding 24 of the relay 26 is thereby deenergized to allow the switch arm 28 to drop in position and thereby energize the alarm 38.

If a load current sensing function is desired, the switch 37 can be moved into contact with terminal 41, and any current flowing through the load 12 and now the resistor 32 will be sensed by the resulting voltage drop across the resistor 32. In this way a predetermined load current, dependent upon the chosen value of the resistor 32 can be made to supply the necessary firing voltage in the order of 3 volts to the control electrode of the rectifier 36. This will trigger or switch the rectifier 36 to effect the desired low impedance path thereby between the conductors 18 and 20 for the purpose of energizing the alarm 38 through operation of the Zener diode 22 and the attendant deenergization of the relay winding 24. It should be understood that the load current sensing function is more required with a power supply 10 that is not current limited in its operation.

A closely regulated power supply 10 can be typical of those needed in analog control systems to provide power for precision potentiometers and operational amplifiers. If the power supply 10 should fail for any reason, the output voltage provided by the power supply 10 could jump to a value such as twice the intended 15 volts output value or it may drop to a value substantially below the 15 volts intended output value. Either of the latter voltage conditions must be detected and cause a protective system lock out to protect the expensive components within the load 12 or to prevent erroneous system operation.

The voltage protective portion of the circuit shown in the drawing constitutes in function a crowbar circuit which has been actually built and tested and thereby proven valuable in detecting voltage condition failures and in protecting amplifiers and potentiometers and the like.

The relay 26 is normally energized since Zener diode 22 is selected to be conductive or breakdown at a few volts less than the nominal output voltage supplied by the power supply 10. If the output voltage from the power supply 10 drops below this conduction voltage of the Zener diode 22, the relay 26 drops out and the switch arm 28 then initiates energization of the alarm 38 and any other provided and suitable lock out protective trip devices as may be desired. On the other hand, if the output voltage provided by the power supply 10 exceeds the few volts greater than the nominal output voltage, such as the 17 volts breakdown voltage of the Zener diode 30, then a conductive path through the resistor 32 is provided and the controlled rectifier 36 fires and provides a substantially low impedance circuit connection across the power supply 10. When the latter event happens the relay 26 again drops out as before to thereby protect the load 12. Thusly it is seen that an overvoltage condition is converted into and sensed by the protective circuit shown in the drawing as an undervoltage condition, which is detected by the branched circuit including the relay winding 24 and the Zener diode 22.

One embodiment of the present invention that was constructed and satisfactorily tested provided a one-third micro second load protection response to an overvoltage condition of the power supply 10.

It should be readily apparent to persons skilled in this art that many obvious modifications in the component values and variations of the circuit of the present invention can be made in the light of and within the scope of the above teachings.

I claim as my invention:

1. In a load protection circuit operative with a voltage source, the combination of first voltage sensing means operative with said voltage source for sensing the occurrence of an undervoltage condition relative to said load, second voltage sensing means operative with said voltage source for providing a control signal upon the occurrence of an overvoltage condition relative to said load, voltage control means operative with said load and responsive to said control signal for providing an undervoltage condition relative to said load, and circuit means connected across said voltage source and operative with said first voltage sensing means to control the voltage supplied to said load upon the occurrence of said undervoltage condition.

2. In a protection circuit for a load and operative with an energy source, the combination of first energy condition sensing means operative with said energy source for providing a first indication of the occurrence of a first predetermined inadequate energy condition relative to said load, second energy condition sensing means operative with said energy source for providing a second indication of the occurrence of a second predetermined excessive energy condition relative to said load, energy control means responsive to said second indication to control the occurrence of said first predetermined inadequate energy condition relative to said load, and circuit means connected across said energy source and responsive to said first indication to control the energization of said load.

3. In a load voltage protection circuit operative with a voltage source, the combination of first voltage sensing means operative with the load for providing a predetermined load voltage control operation upon the occurrence of an undervoltage condition relative to said load, second voltage sensing means operative with said load for providing a control signal upon the occurrence of an overvoltage condition relative to said load, and circuit means connected to said first voltage sensing means and responsive to said control signal to provide an undervoltage condition relative to said load.

4. In a voltage control circuit operative with a voltage source, the combination of first voltage sensing means operative with said voltage source for providing a predetermined voltage control operation upon the occurrence of an undervoltage condition relative to said voltage source, second voltage sensing means operative with said voltage source for providing a control signal upon the occurrence of an overvoltage condition relative to said voltage source, and circuit means connected across said voltage source and responsive to said control signal to reduced to an undervoltage condition the voltage supplied to said first load sensing means.

5. In a load protection circuit operative with an electrical energy source, the combination of first energy sensing means operative with said source for disabling said source upon the occurrence of a first inadequate energy output condition relative to said source, second energy sensing means operative with said source for providing a control signal upon the occurrence of a second excessive energy output condition relative to said source, and circuit means connected across said source and responsive to said control signal to provide said first inadequate energy output condition relative to said first energy sensing means.

References Cited by the Examiner

UNITED STATES PATENTS

| 3,094,647 | 6/1963 | Ferrin | 317—31 |
| 3,243,658 | 3/1966 | Blackburn | 317—31 |
| 3,243,796 | 3/1966 | Harmon et al. | 317—31 X |

OTHER REFERENCES

Silicon Zener Diode and Rectifier Handbook, "undervoltage-supply voltage drop," Motorola, Inc., 1961. Second edition. TK 7872 S4M66, 1961, C.2, p. 79.

MILTON O. HIRSHFIELD, *Primary Examiner.*

J. D. TRAMMELL, *Assistant Examiner.*